(12) United States Patent
Calderwood

(10) Patent No.: US 7,180,429 B2
(45) Date of Patent: Feb. 20, 2007

(54) SLOW MOTION DETECTION SYSTEM

(75) Inventor: Richard C. Calderwood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1132 days.

(21) Appl. No.: 10/076,817

(22) Filed: Feb. 14, 2002

(65) Prior Publication Data

US 2003/0151670 A1   Aug. 14, 2003

(51) Int. Cl.
*G08G 1/017* (2006.01)
(52) U.S. Cl. .................. 340/937; 340/526; 382/103
(58) Field of Classification Search ............ 340/937, 340/936, 435, 436, 523, 539.25, 573.1, 573.3, 340/573.4, 573.5, 526; 382/103, 276; 348/172, 348/699
See application file for complete search history.

(56) References Cited

U.S. PATENT DOCUMENTS

| | | | | |
|---|---|---|---|---|
| 4,392,160 A * | 7/1983 | Minemura | .................... | 386/21 |
| 4,847,688 A * | 7/1989 | Nishimura et al. | .......... | 348/172 |
| 5,040,135 A * | 8/1991 | Aleksoff et al. | ................ | 708/3 |
| 6,377,241 B1 * | 4/2002 | Kage et al. | .................. | 345/158 |
| 6,380,986 B1 * | 4/2002 | Minami et al. | .............. | 348/699 |
| 6,681,031 B2 * | 1/2004 | Cohen et al. | ................ | 382/103 |
| 6,950,534 B2 * | 9/2005 | Cohen et al. | ................ | 382/103 |

* cited by examiner

*Primary Examiner*—Van T. Trieu
(74) *Attorney, Agent, or Firm*—Blakely, Sokoloff, Taylor & Zafman LLP

(57) ABSTRACT

Searching through a series of images such as video images for slowly-moving objects such as enemy snipers, using pattern matching, color matching, brightness matching, or the like. Multiple search speeds facilitate finding objects moving at different velocities through the visual field. Search speeds can be determined as, e.g. every Nth frame, or a frame from every Nth period of time. Background motion, such as bushes blowing in the wind, do not trigger false positives.

42 Claims, 2 Drawing Sheets

SLOW MOTION DETECTION SYSTEM

BACKGROUND OF THE INVENTION

1. Technical Field of the Invention

The present invention relates generally to computerized motion detection in a series of video images, and more specifically to a system for detecting objects which are moving slowly through a visual field.

2. Background Art

Motion detection systems and methods are well known in the computer video art. However, these deal with detecting fast motion, typically for purposes of enhancing video compression between consecutive frames in a video sequence running at e.g. 30 frames per second. Objects that move sufficiently slowly through the video field will not be detected by these systems. These systems are quite good at detecting sufficiently fast motion objects, including background scenery which is e.g. blowing in the wind.

Another, unrelated type of motion detection system exists wholly outside the field of computer video or vision— building security systems which use sonar, radar, and/or infrared imaging to detect moving objects against a still, unchanging background. These systems are relatively useless in applications in which the background itself is moving, especially if the background is moving more quickly than the object to be detected. It is known that the user can adjust the sensitivity of these systems to filter out false positives caused by erroneous detection of background motion, such as trees blowing in the wind. It is also known that the user can adjust the sensitivity to suppress detection of small objects, such as a cat or a butterfly passing through the system. As a consequence, it is also known that if e.g. a burglar moves slowly enough, he will avoid detection.

What is needed is a system capable of detecting objects which are moving slowly, including those moving more slowly than the background against which they are presented.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
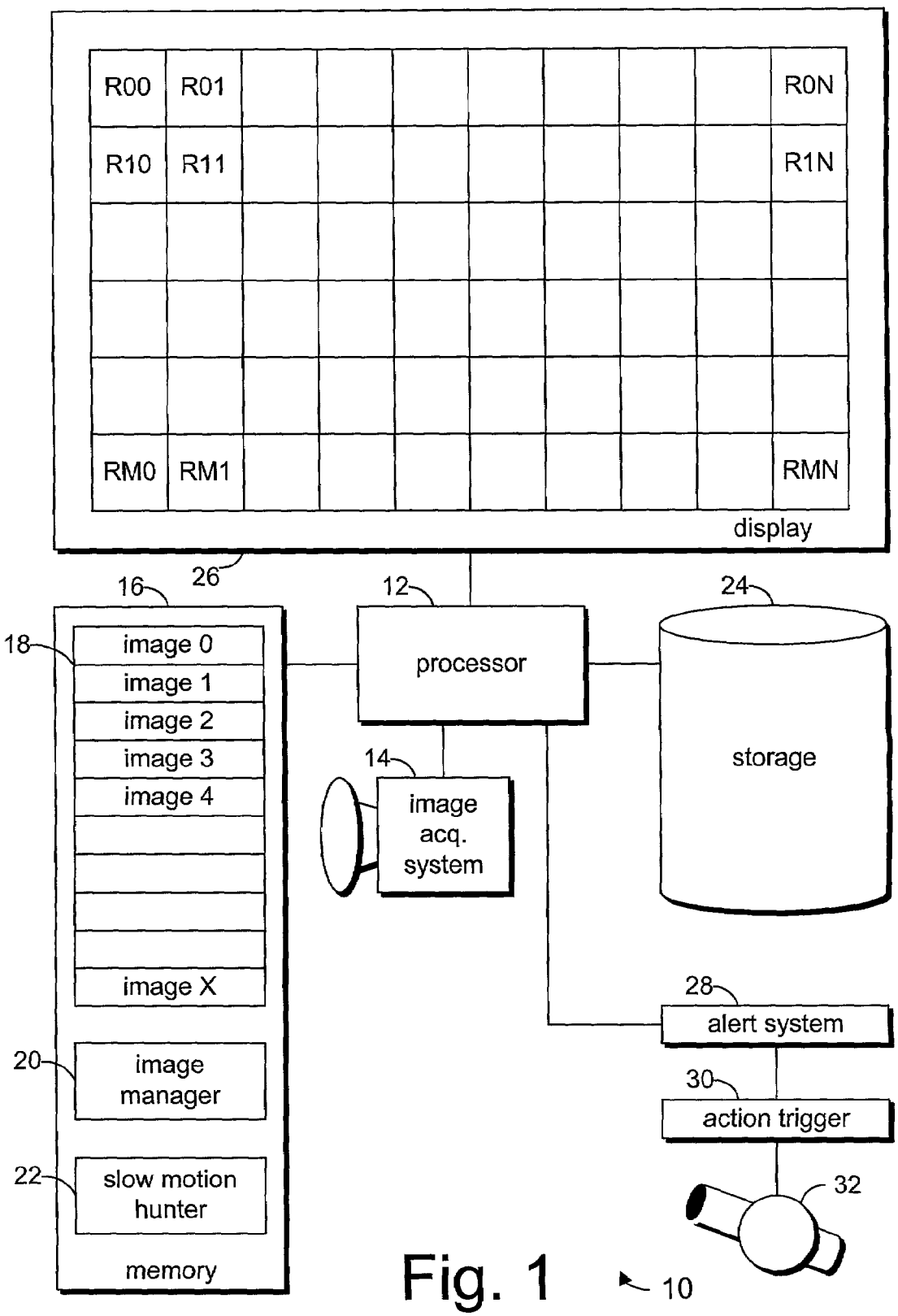
FIG. 1 shows one exemplary embodiment of a computerized video system according to this invention.

FIG. 1 shows a system 10 according to one exemplary embodiment of the invention. The system includes a processor 12 for performing logic operations of the system. The system includes an image acquisition system 14 such as a video camera, a still camera, or other suitable imaging device, such as a radar system, sonar system, an infrared imager, a thermal imaging pickup, or the like.

The system includes a memory 16 for holding a sequence 18 of images from the image acquisition system, image manager software 20 for managing the sequence of images, and slow motion hunter software 22 for performing the slow motion hunting itself. Alternatively, the invention could be performed using hard-wired logic, of course. The system may further include bulk storage 24 such as a hard disk, CD-R drive, or other suitable archival or storage means for saving images or series of images and the like. The reader will appreciate that the storage and memory may be implemented using a wide variety of technologies, and that they may be variously partitioned. The reader will understand that the slow motion hunter and other software may reside on the bulk storage when the system is not running, and that an operating system may load it into memory for execution at run-time. The storage and the memory may collectively be referred to as either "storage" or "memory".

The system can include a video display apparatus 26 suitable for presenting an image or series of images to a human user. The system is advantageously equipped with a suitable alert system 28 such as an audible alarm, visual alarm, paging system, or other suitable mechanism for alerting human operators that the slow motion hunter software has identified a moving object that may require further human analysis or action. In some embodiments, the alert system may include an action trigger 30 for automatically taking some direct action as a result of the identification of a moving object. One such action can be to provide targeting data to a weapons system 32.

In some embodiments, the slow motion hunter software may divide each image (IMAGE 0 through IMAGE X) into a plurality of regions, generally shown in the display as region R00 (meaning "region at row 0, column 0") through region RMN (meaning "region at row M, column N"). The slow motion hunter may hunt for motion using one or more of a variety of techniques, such as object matching, color matching, brightness matching, and so forth, as will be readily understood by those of ordinary skill in the relevant art.

Figure 2:
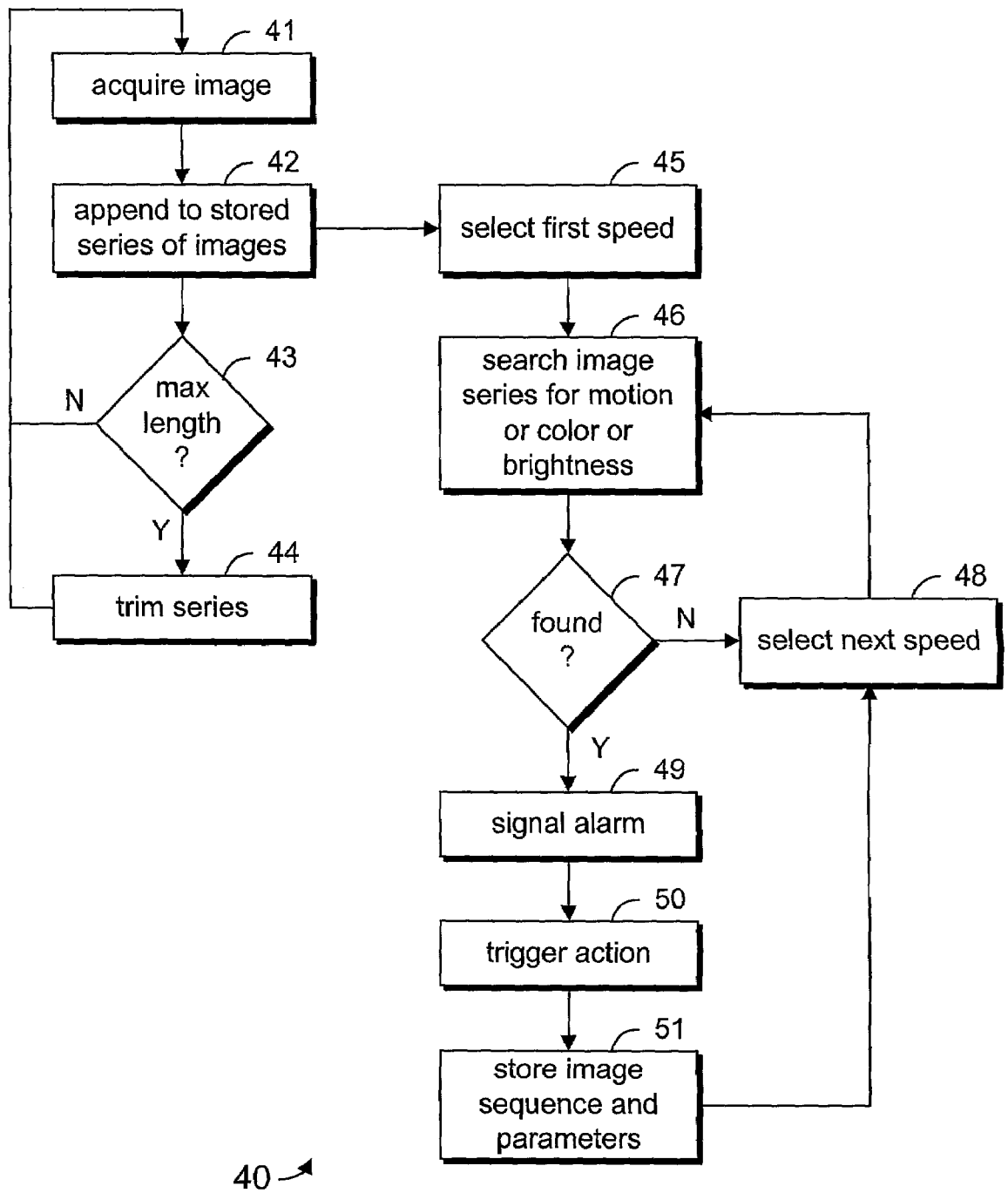
FIG. 2 shows one exemplary embodiment of a method of operation of the invention.

FIG. 2 illustrates one exemplary embodiment of a method 40 of operation of the slow motion detection system. The image acquisition system acquires (41) an image, and the image manager appends (42) the new image to the series of images. If (43) the series has reached a maximum length (either by reaching some predetermined count, or predetermined memory capacity, or the like), the image manager trims (44) the series, such as by deleting an oldest image in the series, or other suitable methodology. The image acquisition system and image manager can continue to operate in this loop, independently of operation of the slow motion hunter.

In one embodiment, the slow motion hunter performs its hunting using a variety of hunt speeds through the series of images. This can be advantageous in hunting for objects whose velocity through the image field is not known beforehand. The slow motion hunter selects (45) a first hunt speed, and searches (46) through the series of stored images using any of its criteria such as pattern recognition, color recognition, brightness recognition, and so forth. The speed can, in some embodiments, be expressed in terms of how many images to skip between "frames". Skipping zero images results in searching for real-time motion. Skipping twenty-nine images results in searching for motion that is $\frac{1}{30}^{th}$ real-time speed. The speed can be determined either in terms of frames to skip, or by time-stamp of the images, or any other suitable mechanism, or could even be random.

If (47) no motion is detected at the presently-selected speed, the slow motion hunter selects (48) a next speed, and returns to searching for a moving object. If, however, motion is found, the slow motion hunter triggers the alarm system, which signals (49) the alarm and triggers (50) any other suitable action, such as providing targeting data to a weapons system. It may be found advantageous to then store (51) the sequence of images in which the motion was found, (which may be only those images that caused the hit, or the complete series of images including skipped frames) and any relevant search parameters such as what type of search (color, pattern, etc.) found the motion. This will enable future review by human operators, yet allow the image manager to go about its business of trimming the series and so forth, without the system losing the relevant images, especially if the sequence is stored to the permanent storage.

Even if motion is found, it may be found advantageous to continue searching through the same sequence, in case another search speed finds another object moving at a different velocity.

The slow motion hunter software may take advantage of the general characteristic that landscape scenery, while moving in semi-random patterns, tends to move around in a very localized manner. That is, entire trees don't slowly creep over the hill, or go from left to right in the visual field. Their leaves and branches may move around, but only around a general central location. The slow motion hunter software may, among other things, watch for objects that progress steadily in one direction, or that make extreme progress over the visual field over time. Another thing that it may watch for is objects that are not blowing in the wind; that is, while the whole scene is generally in motion, some objects will not be, such as buildings, tree trunks, and soldiers, and it may focus attention on these to watch for motion.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

Acknowledgement

I conceived this invention while, after reading Stephen Hunter's excellent novel "Time to Hunt", contemplating the problem of military sentries attempting to spot very-slowly-moving enemy snipers infiltrating their perimeter dressed in ghillie suits. The human eye is very sensitive to motion, but can have a difficult time detecting a slowly-moving object against a background which is moving more quickly, such as a creeping sniper in a field of grass that is blowing in the wind. Mr. Hunter's book made no mention of any solution to this problem, however.

A royalty-free license is hereby granted to the United States Government to make, have made, and use this invention solely for the protection of American military personnel serving under sole command and control of the United States military. Diu Vivo Patria Nostra.

What is claimed is:

1. An apparatus comprising:
    an image acquisition system;
    a processor;
    a memory coupled to the processor; and
    stored in the memory,
    a slow motion hunting software, executable by the processor, to identify an object moving slowly through a series of images from the image acquisition system,
    wherein the slow motion hunting software is adapted to search for the motion through the series of images at a fraction of a real-time speed.

2. The apparatus of claim 1 wherein the slow motion hunting software comprises:
    software adapted to hunt at a plurality of speeds through the series of images.

3. The apparatus of claim 2 wherein the slow motion hunting software further comprises:
    software adapted to continue hunting at other speeds after identifying, at one speed, an object moving through the series of images, to identify another object moving slowly through the series of images.

4. The apparatus of claim 1 further comprising:
    an alert system coupled to the processor to provide an alert in response to the slow motion hunting software identifying the slowly moving object.

5. The apparatus of claim 1 wherein the image acquisition system comprises a camera.

6. The apparatus of claim 5 wherein the camera comprises a still camera.

7. The apparatus of claim 5 wherein the camera comprises a video camera.

8. The apparatus of claim 1 further comprising bulk storage coupled to the processor to store a series of images in which the slow motion hunting software identified the slowly moving object.

9. The apparatus of claim 1 further comprising an image display device.

10. The apparatus of claim 1 further comprising:
image manager software to manage the series of images.
11. The apparatus of claim 1 further comprising:
an action trigger responsive to the slow motion hunting software identifying a moving object, to trigger an action.
12. The apparatus of claim 11 wherein the action trigger triggers the action by sending targeting data to a weapons system.
13. The apparatus of claim 12 further comprising:
the weapons system.
14. A motion detection system for use with an image acquisition device, the system comprising:
processor means for performing logical operations of the system; and memory means storing,
software means for managing a series of images from the image acquisition system, and software means for hunting through the series of images for an object moving slowly through a field of vision of the image acquisition device, wherein the software means is adapted to hunt at a plurality of speeds that includes a fraction of a real-time speed.
15. The motion detection system of claim 14 wherein the software means for hunting comprises:
means for selecting, in series, each of a plurality of hunt speeds; and
means for hunting through the series of images at the selected hunt speed.
16. The motion detection system of claim 15 wherein the software means for hunting further comprises:
means for continuing to hunt at different hunt speeds after identifying a slowly-moving object while hunting at a first hunt speed.
17. The motion detection system of claim 15 wherein the hunt speeds are determined in terms of numbers of frames to skip in the series of images.
18. The motion detection system of claim 17 further comprising:
means for signaling an alarm in response to the software means for hunting having found an object moving slowly through the field of vision.
19. The motion detection system of claim 18 further comprising:
means for providing targeting data to a weapon in conjunction wit the alarm.
20. The motion detection system of claim 19 further comprising:
the weapon.
21. A method comprising:
selecting a first search speed wherein the first search speed includes a fraction of a real-time speed;
searching, at the selected search speed, a series of images for an object moving slowly through a field of view of the images;
if the searching at the selected search speed found an object moving slowly through the field, signaling an alarm;
selecting a next search speed; and
returning to the searching of the series of images with the next search speed.
22. The method of claim 21 wherein searching comprises pattern matching.
23. The method of claim 21 wherein searching comprises color matching.
24. The method of claim 21 wherein searching comprises brightness matching.
25. The method of claim 21 further comprising:
if the searching found an object moving slowly through the field, storing the series of images for subsequent review.
26. The method of claim 25 Thither comprising:
if the searching found an object moving slowly through the field, storing parameters related to the searching which found the object.
27. The method of claim 26 wherein the parameters comprise at least the search speed and a type of search.
28. The method of claim 21 wherein signaling the alarm further comprises:
providing targeting data to a weapons system.
29. An article of manufacture comprising:
a machine-accessible medium including data that, when accessed by a machine, cause the machine to perform the method of claim 21.
30. The article of manufacture of claim 29 wherein the machine-accessible medium further includes data that cause the machine to perform the method of claim 26.
31. The article of manufacture of claim 29 wherein the machine-accessible medium comprises a recording medium bearing the data.
32. The article of manufacture of claim 29 wherein the machine-accessible medium comprises a carrier wave bearing the data.
33. A method of identifying a slowly-moving enemy, the method comprising:
capturing a series of visual images of a landscape in which scenery is moving in wind;
searching through the series of visual images at a fraction of a real-time speed for motion which, over time, progresses over a visual field in a manner inconsistent with being merely wind motion.
34. The method of claim 33 wherein the manner inconsistent with being merely wind motion comprises motion over a greater distance than wind would account for.
35. The method of claim 33 wherein the manner inconsistent with being merely wind motion comprises motion that lacks a wind-like pattern.
36. The method of claim 33 wherein the manner inconsistent with being merely wind motion comprises motion at a long-term velocity different than wind would account for.
37. The method of claim 33 wherein the searching comprises:
searching at a plurality of hunt speeds.
38. The method of claim 37 wherein searching at a plurality of hunt speeds comprises:
alter identifying an enemy while searching at one speed, continuing to search at a different speed.
39. An ankle of manufacture comprising:
a machine-accessible medium including data that, when accessed by a machine, cause the machine to perform the method of claim 33.
40. The article of manufacture of claim 39 wherein the machine-accessible medium further includes data that cause the machine to perform the method of claim 37.
41. The article of manufacture of claim 39 wherein the machine-accessible medium comprises a recording medium bearing the data.
42. The article of manufacture of claim 39 wherein the machine-accessible medium comprises a carrier wave bearing the data.

* * * * *

UNITED STATES PATENT AND TRADEMARK OFFICE
CERTIFICATE OF CORRECTION

PATENT NO. : 7,180,429 B2  Page 1 of 1
APPLICATION NO. : 10/076817
DATED : February 20, 2007
INVENTOR(S) : Calderwood It is certified that error appears in the above-identified patent and that said Letters Patent is hereby corrected as shown below:

In column 5, at line 45, delete "wit" and insert --with--.

In column 6, at line 52, delete "ankle" and insert --article--.

Signed and Sealed this

Eighth Day of April, 2008

JON W. DUDAS
*Director of the United States Patent and Trademark Office*